Aug. 8, 1939.　　　　A. AMES, JR　　　　2,168,308
TESTING PERCEPTION OF SPACE
Filed Sept. 24, 1935　　　10 Sheets-Sheet 1

Inventor
Adelbert Ames Jr.
By Roberts, Cushman & Woodbury
Attys.

Aug. 8, 1939.  A. AMES, JR  2,168,308
TESTING PERCEPTION OF SPACE
Filed Sept. 24, 1935  10 Sheets-Sheet 2

Inventor
Adelbert Ames Jr,
by Roberts, Cushman & Woodbury
Attys.

Aug. 8, 1939.  A. AMES, JR  2,168,308
TESTING PERCEPTION OF SPACE
Filed Sept. 24, 1935  10 Sheets-Sheet 3
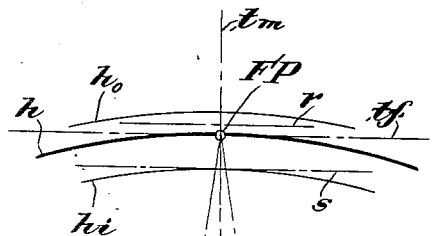
Fig. 6
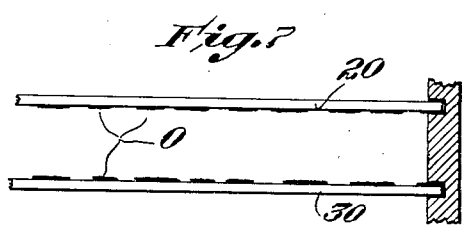
Fig. 7
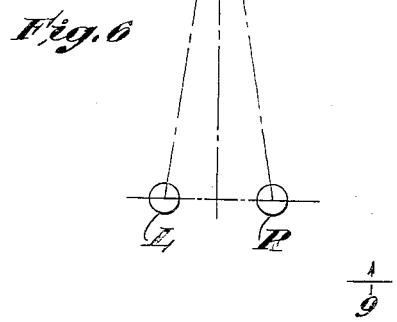
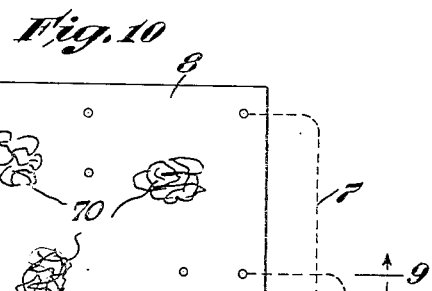
Fig. 10
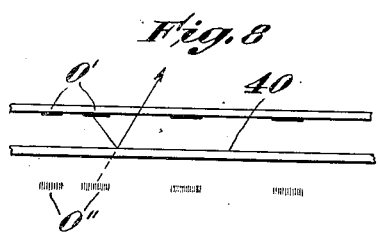
Fig. 8
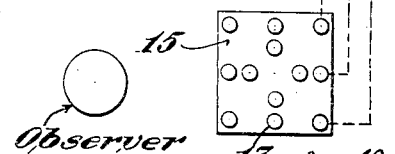
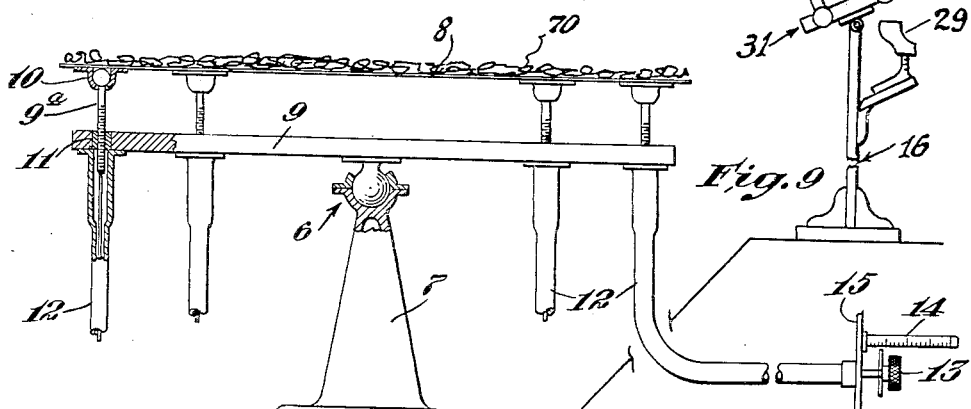
Fig. 9
Inventor
Adelbert Ames Jr
by Roberts, Cushman & Woodbury,
Att'ys.

Aug. 8, 1939.   A. AMES, JR   2,168,308
TESTING PERCEPTION OF SPACE
Filed Sept. 24, 1935   10 Sheets-Sheet 4
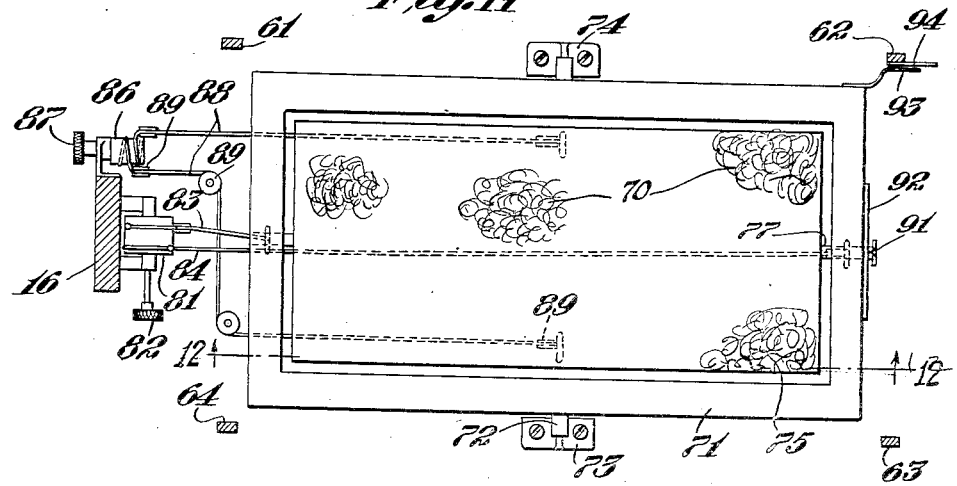
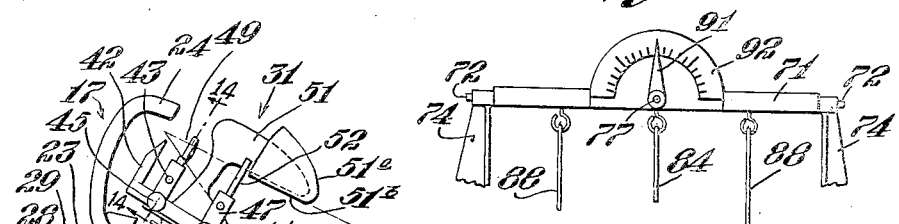
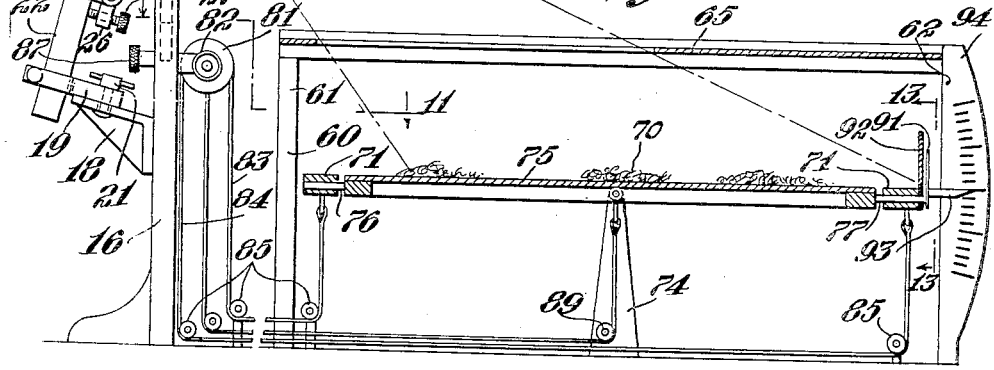
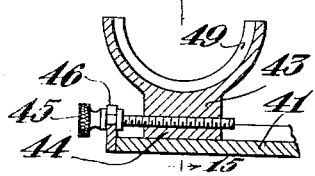
Fig.15  Inventor
Adelbert Ames Jr
by Roberts, Cushman & Woodbury,
attys.

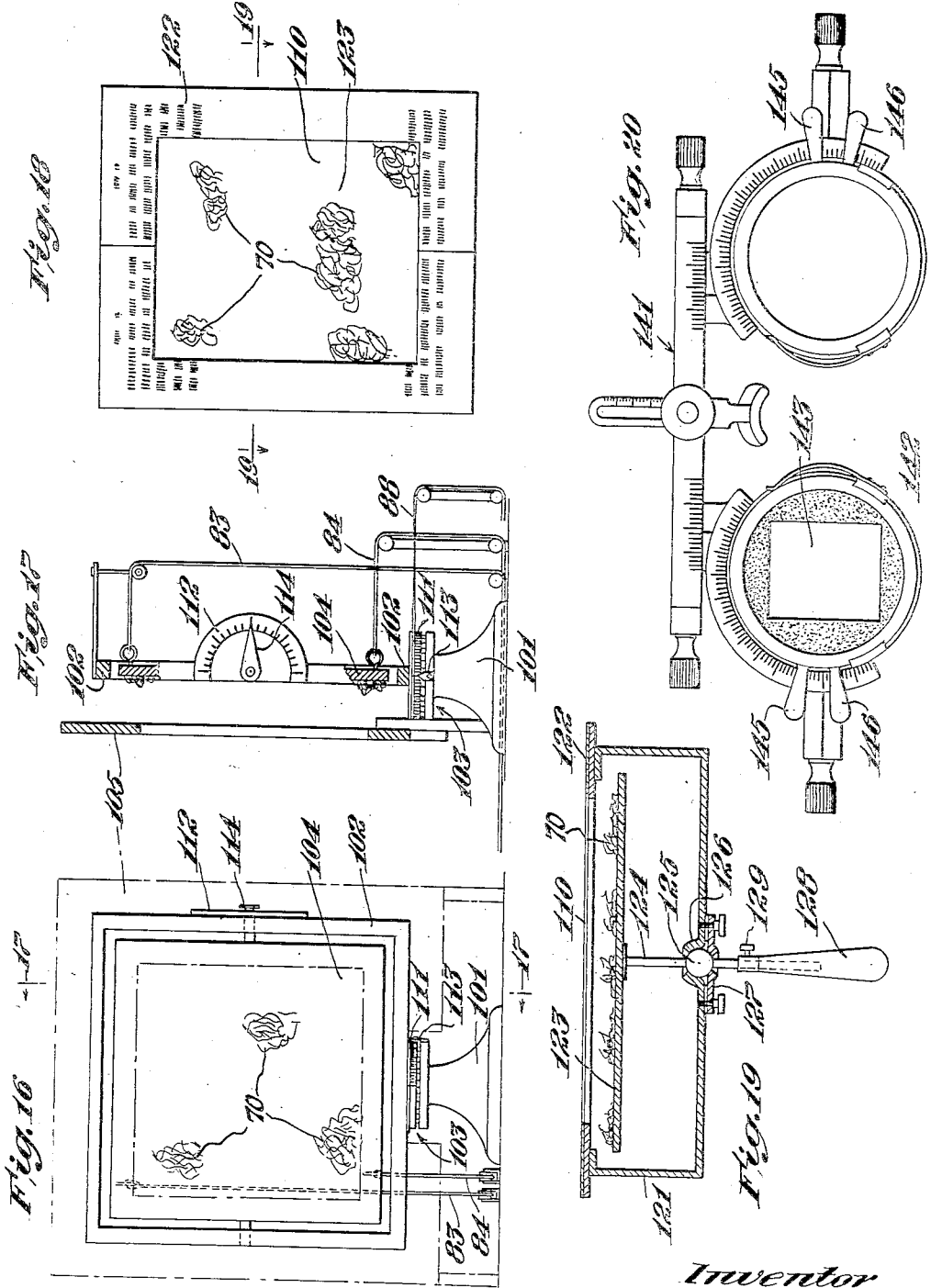

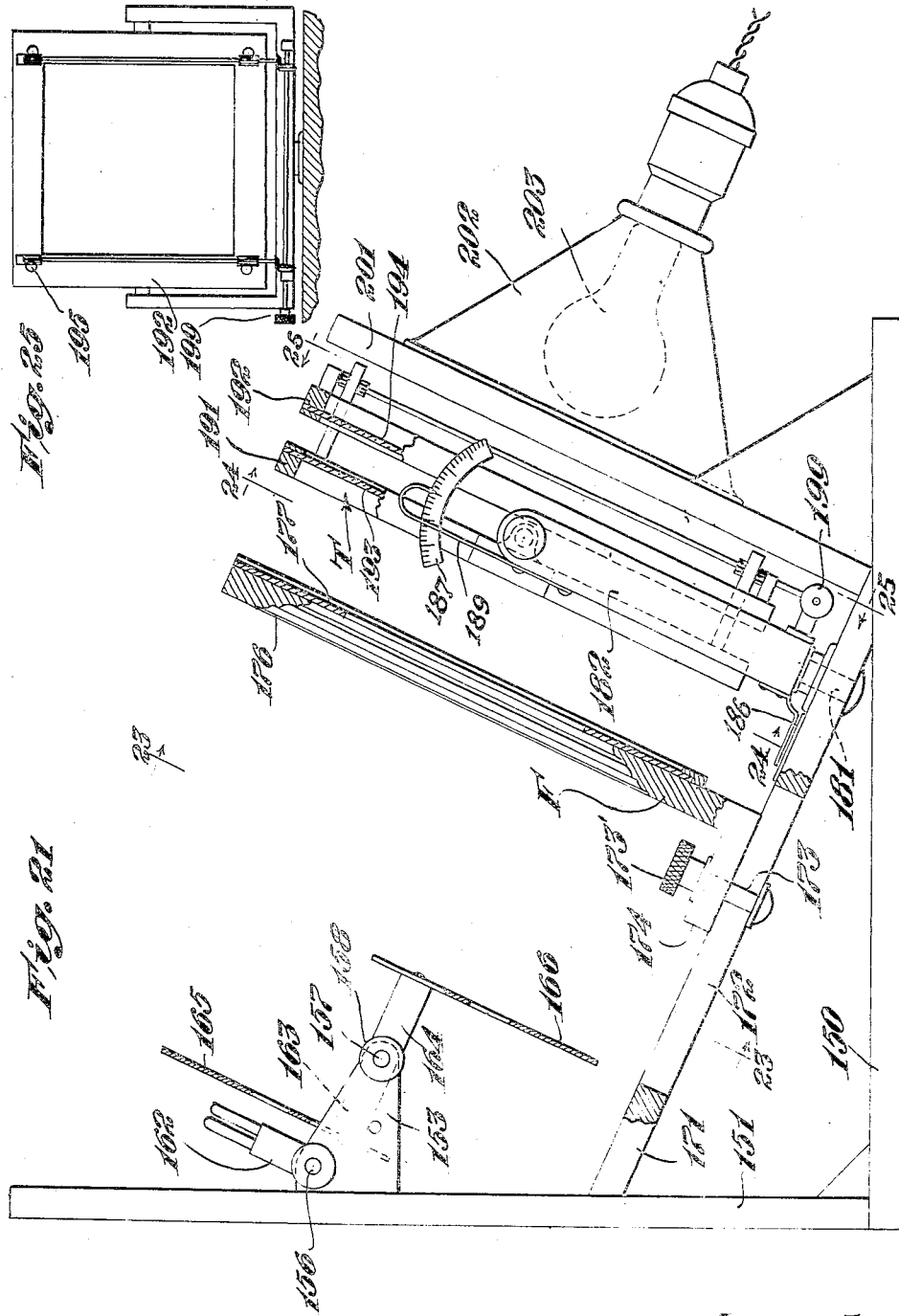

Aug. 8, 1939. A. AMES, JR 2,168,308
TESTING PERCEPTION OF SPACE
Filed Sept. 24, 1935 10 Sheets-Sheet 7
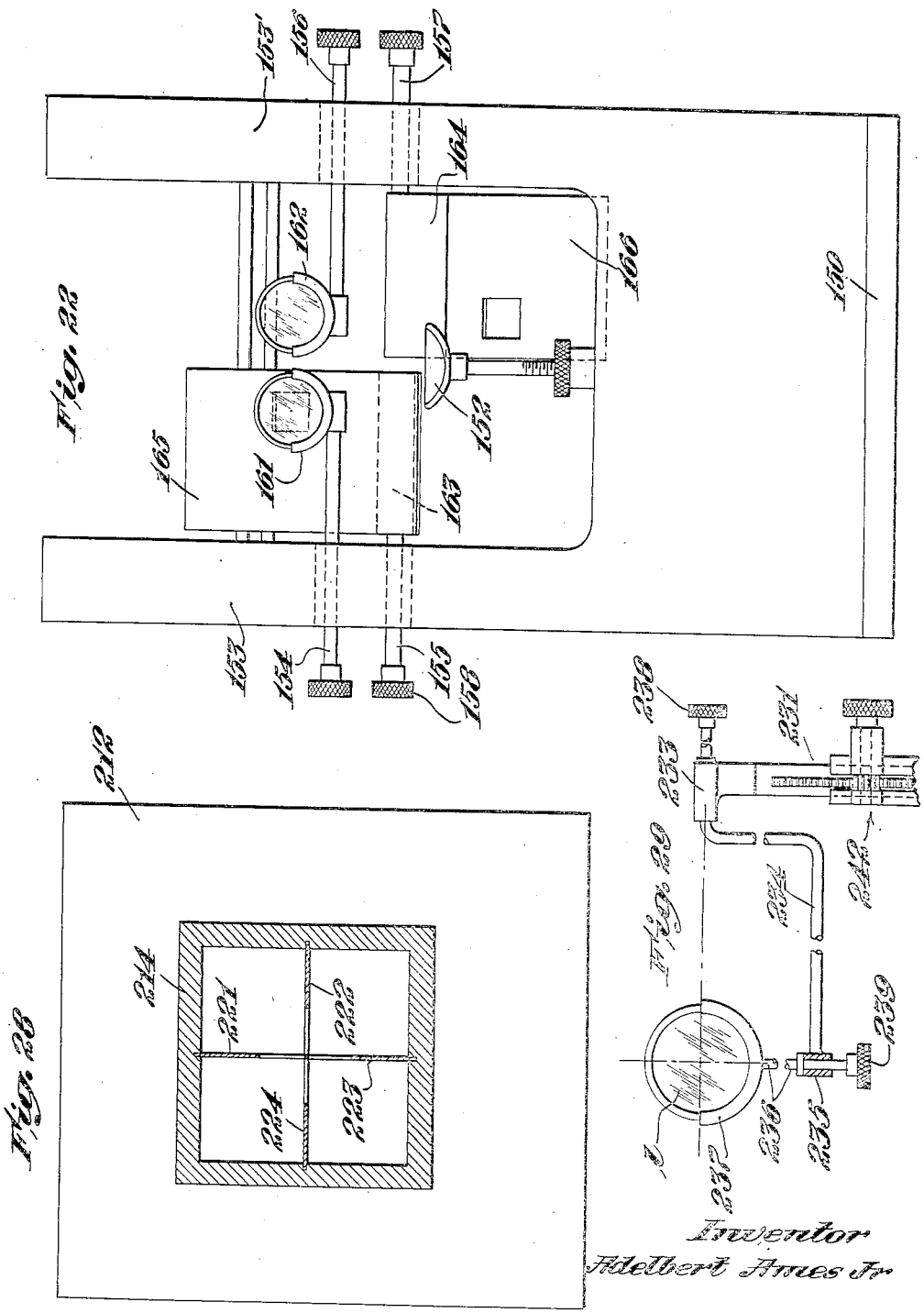
Inventor
Adelbert Ames Jr
By Roberts, Cushman & Woodberry
Attorneys.

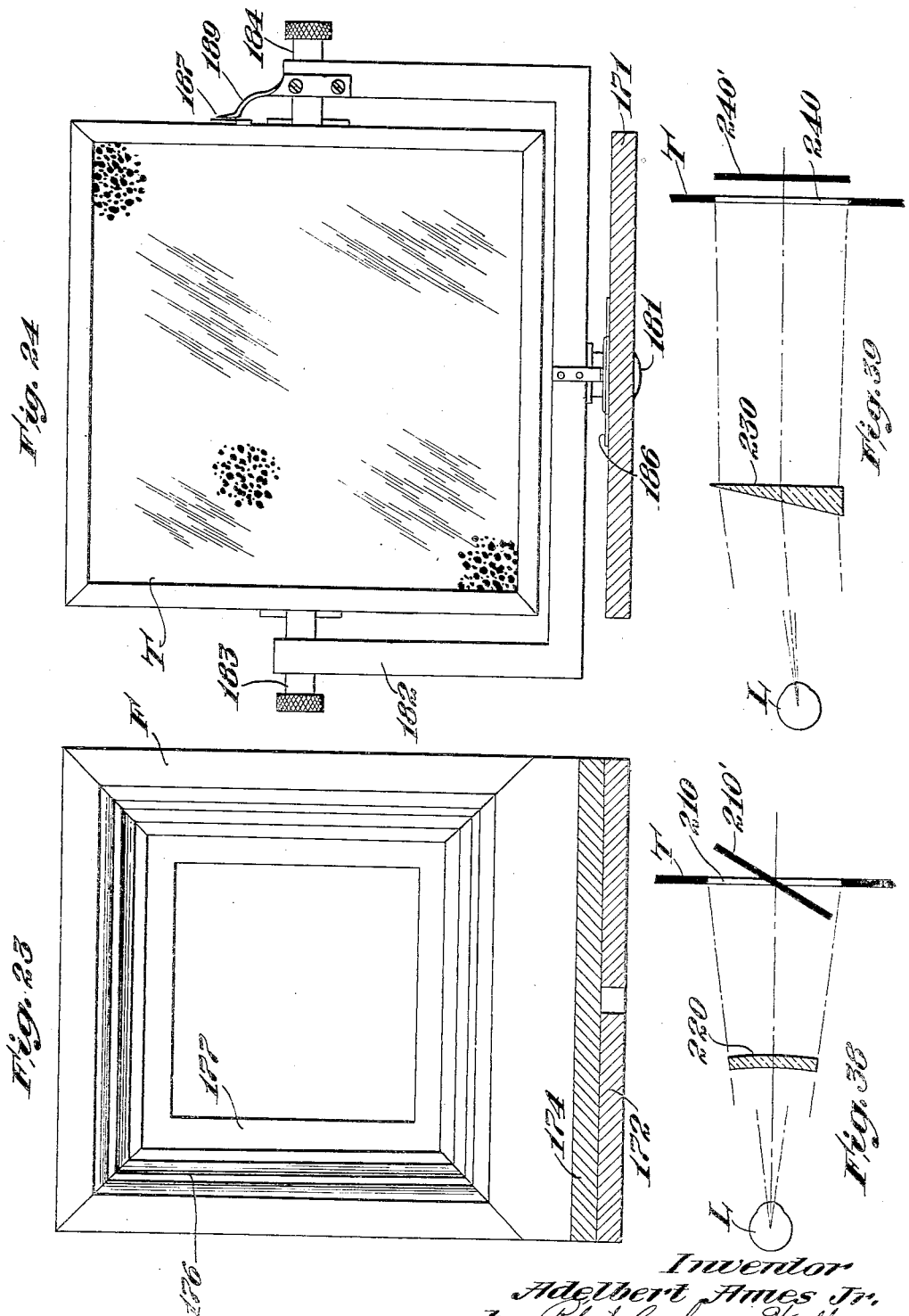

Aug. 8, 1939.   A. AMES, JR   2,168,308
TESTING PERCEPTION OF SPACE
Filed Sept. 24, 1935   10 Sheets-Sheet 9
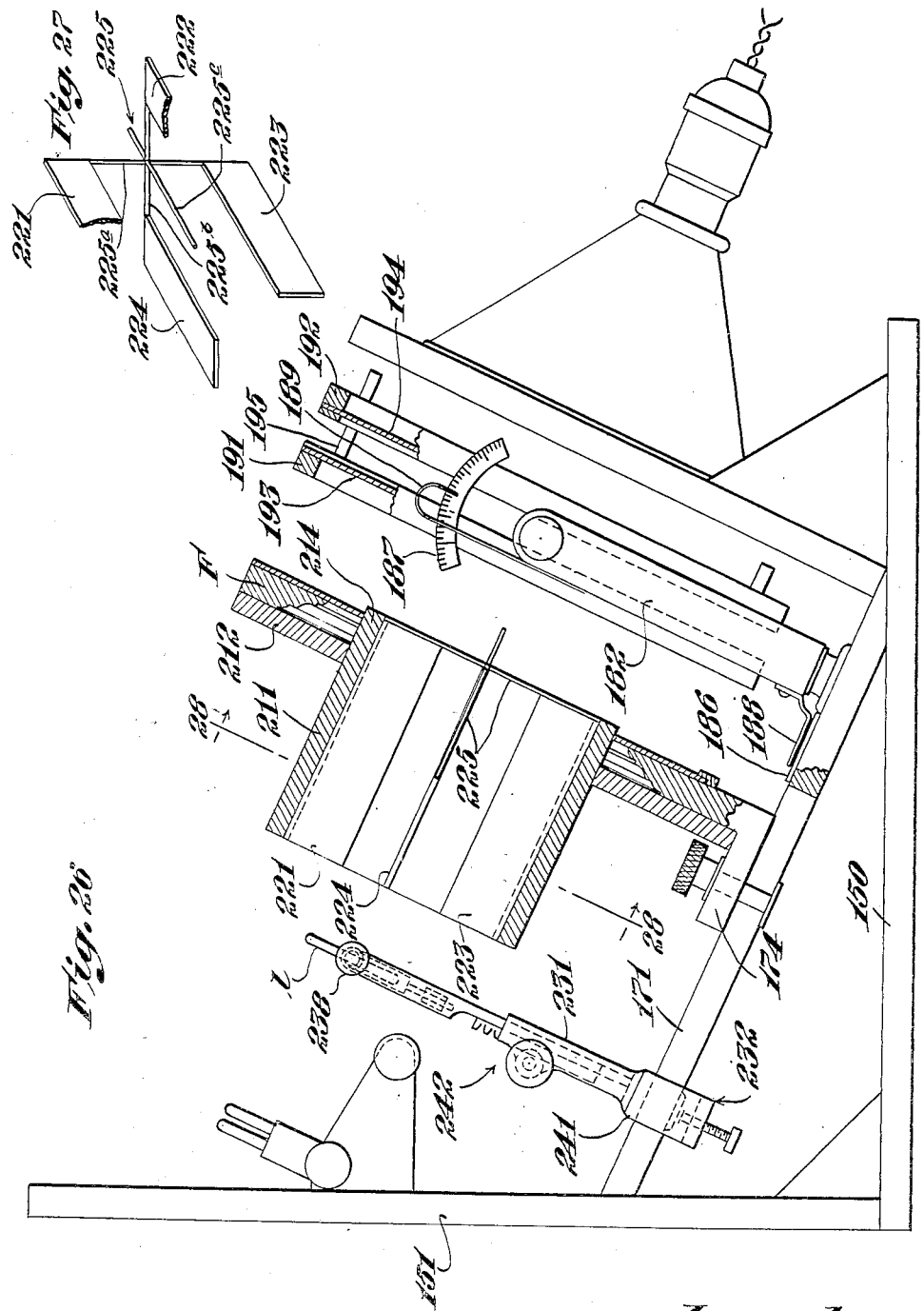
Inventor
Adelbert Ames Jr.
by Roberts, Cushman & Woodberry,
Attys.

Aug. 8, 1939.　　　A. AMES, JR　　　2,168,308

TESTING PERCEPTION OF SPACE

Filed Sept. 24, 1935　　　10 Sheets-Sheet 10

Inventor
Adelbert Ames Jr.
By Roberts, Cushman & Woodberry,
Attys.

Patented Aug. 8, 1939

2,168,308

UNITED STATES PATENT OFFICE 2,168,308

TESTING PERCEPTION OF SPACE

Adelbert Ames, Jr., Hanover, N. H., assignor to Trustees of Dartmouth College, Hanover, N. H., a corporation of New Hampshire Application September 24, 1935, Serial No. 41,890

23 Claims. (Cl. 88—20)

The present invention deals with the problem of testing human eyes, especially with regard to space perception.

Some of the principal objects of the invention are to provide methods, and means for carrying out such methods, for determining correct perception of space as dependent on orientation, and monocular and binocular vision, to check the presence or absence of correct space perception, and to determine or to check correcting instrumentalities suitable to restore correct perception of space, especially as influenced by the relative size or shape, of the ocular images.

These and other objects, aspects and features of my invention will be apparent from the following detailed explanation illustrating the genus of the invention with reference to several embodiments thereof. The description refers to drawings, in which:

Fig. 6 is a diagram explaining the adaptation of a test screen to the fusional area;

Figs. 7 and 8 are sections through test screens as indicated in Fig. 6;

Figs. 9 and 10 show, in schematical plan view and side elevation, respectively, a device for warping a test table, Fig. 9 being partly a section on line 9—9 of Fig. 10;

Fig. 11 shows a practical embodiment of the testing device shown in Figs. 4 and 5, partly in section on line 11—11 of Fig. 12;

Fig. 12 is a vertical section on line 12—12 of Fig. 11;

Fig. 13 is a vertical section on line 13—13 of Fig. 12;

Fig. 14 is a vertical section on line 14—14 of Fig. 12;

Fig. 15 is a section on line 15—15 of Fig. 14;

Fig. 16 is a front elevation of an embodiment with vertical test planes;

Fig. 17 is a vertical section on line 17—17 of Fig. 16;

Fig. 18 is a plan of an object for testing near vision;

Fig. 19 is a section on line 19—19 of Fig. 18;

Fig. 20 is a view of a test frame to be used with the device according to Figs. 18 and 19;

Fig. 21 is a side elevation, partly in section, of another embodiment of my invention;

Fig. 22 is a front elevation of the embodiment shown in Fig. 21;

Fig. 23 is a section on line 23—23 of Fig. 21;

Fig. 24 is a section on line 24—24 of Fig. 21;

Fig. 25 is a section on line 25—25 of Fig. 21;

Fig. 26 is similar to Fig. 21, but with a perspective frame inserted and with a lens holder clamp;

Fig. 27 is a schematical drawing of the perspective object of Fig. 26;

Fig. 28 is a section on line 28—28 of Fig. 26;

Fig. 29 is a front elevation of the lens holder shown in Fig. 25; and

Figs. 30 to 39 are diagrams indicating the response of the new testing method to certain ocular defects.

Figure 2:
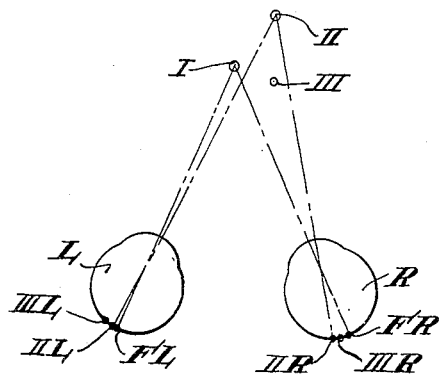
Figs. 1, 2 and 3 are diagrams explaining binocular vision in its relation to the present invention.

The position of objects relatively to one another, and to a system of reference including the observer himself is made conscious to the latter through the influence of various factors. On the one hand, his orientation in space (or rather in the gravitational field constituting a system of reference), is conveyed to him mainly through the function of his static sense or his vestibular balance apparatus or both, including the vestibule and the semicircular canals in the bony labyrinth of the internal ear. This type of space perception will be referred to herein as "vestibular orientation".

On the other hand, the position of objects relatively to one another and to the system of reference of which he is a part is conveyed to him mainly through his contact with the objects by visual response, other contacts as touch, hearing, temperature and others being of secondary importance. Visual response again, as inducing perception of the location of objects in space, operates in various ways.

One way of visual space perception is primarily based on the fact that ocular images are of the nature of conical projections or perspectives with their well-known different representation of objects differently located in space, although otherwise of similar characteristics. Phenomena of similar effect are those due to aerial perspective (that is, color changes due to distance), to the peculiar structure of the human eye (as, for example, producing different color fringes at different distances, or changing the sharpness of contours with their distances), to the effect of obstruction of distant objects by nearer ones, to parallax resulting from movement of the eyes, and others.

This type of space perception is, of course, effective in purely monocular vision, although, as will be presently discussed, perspective is also a factor in binocular vision. Space perception through perspective, conveyed to consciousness only by one eye, will be referred to herein as "monocularly perspective vision".

Another way of becoming cognizant of the distribution of objects and surfaces in space is through stereoscopic vision. Due to the lateral separation of the two eyes of an individual, a field including objects at different distances produces different ocular images. The slight disparities of the positioning of the two images of the same objects tells the observer the relative distance of the objects. In stereoscopic vision, two causes of ocular image disparity can be distinguished.

One cause is the dissimilarity of the perspectives in the two eyes, these different perspective appearances being mentally interpreted into three dimensions. This type of space perception will be termed "perspective stereoscopic vision".

Another cause of stereoscopic vision is disparity of the ocular images due to causes other than perspective, it being evident that objects which lend themselves poorly, or not at all, to inducing perspective (for example, objects not having rectilinear patterns) nevertheless can be located in space if binocularly seen. This phase of space perception will herein be called "non-perspective stereoscopic vision".

In this context, the term "ocular image" is used to describe the impression formed in the higher brain centers through the vision of one eye. It is determined not only by the properties of the dioptric image that is formed on the retina of the eye, but also by the modifications imposed upon that image by the anatomical properties and physiological processes by which this optical image is carried to the higher brain centers. Visual conditions which have to do with the size and shape of ocular images are shortly termed "eikonic", the condition in which the size or shape, or both, of ocular images are incongruent is referred to an "aniseikonia", and the condition where the ocular images are substantially congruent, as "iseikonia".

Aniseikonia includes overall ocular image size differences in which one image is larger than the other in all meridians, and meridional differences in which one image is larger than the other in one meridian. This term also includes incongruence in binocular vision introduced by anomalies of the declinations of the eyes. This declination aniseikonia is characterized by relative rotation of certain meridians of the ocular images.

Figure 1:
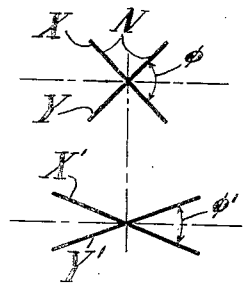

Different declinations of corresponding meridians of the ocular images are an actually observed defect which can be artificially produced by obliquely applied meridional size or eikonic lenses, that is lenses changing the image size in one meridian without affecting the light vergence, as for example described in Patent No. 1,933,578, of November 7, 1933. Referring to Fig. 1, if a rectangular cross N is observed through such a lens, the images X', Y', of meridians X and Y will form an angle $\phi'$ different from angle $\phi$ subtended by meridians X and Y.

A cause of this defect may be deformation of the eyeball, or certain aspects of the muscular defect known as cyclophoria. If the upper ends of the vertical diameters of the ocular images are tipped nasalward, the error of declination is called "conclination", while, if the upper ends are tipped templeward, the error of declination is termed "disclination".

It has been observed that it does not matter with regard to binocular space perception whether or not horizontal meridians are turned relatively to one another. The relative rotation of horizontal meridians influences binocular vision to a substantial degree only when it becomes so pronounced that it interferes with or actually breaks fusion, that is, makes binocular vision difficult or impossible.

Still another type of aniseikonia is asymmetric distortion similar to the effect of prismatic lenses, as for example described in copending application Serial No. 750,162, filed November 26, 1934.

The concept of vestibular orientation needs no further explanation, but a few facts concerning monocularly perspective vision and stereoscopic vision (non-perspective as well as perspective) will have to be given in order to facilitate the understanding of the present invention.

An object viewed monocularly appears at different distances if the overall size of the respective ocular image is changed, the object appearing more distant if the image becomes smaller, and vice versa, these changes being, however, not very pronounced and in most cases negligible since the aniseikonic differences connected with binocular vision are only a few percent. Changes in the horizontal meridian, and likewise in the vertical meridian have no substantial effect upon the apparent distance of monocularly seen objects. The above explained declination aniseikonia causes vertical lines to appear tipped, but this effect is only of secondary character regarding judgment of position of monocularly seen objects in space. As a whole, it can be said that monocularly perspective vision is not substantially influenced by changes in size or shape of ocular images.

Coming now to stereoscopic vision, its non-perspective aspect will first be discussed with reference to Fig. 2. In this figure, I and II are two objects in space at different distances from the observer whose right and left eyes are shown at R and L, respectively. If the observer fixes object I, images of I are formed on the fovea of each eye at FR and FL. Images of point II are formed on the retina at IIR and IIL, respectively. It is evident that the similar images IIR and IIL are formed at disparate points of the retina, at different sides of points IIIR and IIIL which would correspond to a point III which lies on the horopter passing through point I. This disparity is translated into difference in distance and object II appears as a single object farther away than object I. It will be easily seen that an analogous disparity exists for an object nearer than I. The particular nature and amount of this disparity is translated into difference in distance. The normal threshold sensitivity for this disparity is very low, an angle of about 10", so that stereoscopic judgment of depth is very accurate.

The effect of aniseikonia upon non-perspective stereoscopic space perception will now be understood to take place as follows:

In Fig. 2, the distance that object II is seen behind I depends upon the particular disparity of images IIR and IIL from points IIIR and IIIL. If for some reason the relation of size or shape, or both, of the ocular images is changed, for example the image of the right eye as compared with that of the left, this particular disparity is changed and II appears nearer if the right ocular image is smaller, or farther if the latter is larger. The magnitude of these changes is relatively great, increasing with distance. For example, a difference of 3% in the horizontal meridian of the two ocular images causes a surface at the distance of one meter to appear tipped about 19°.

Figure 3:
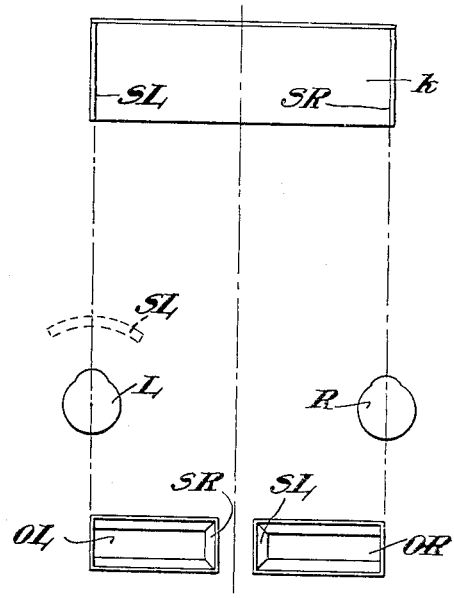

The above applies strictly only to objects perceived substantially without the influence of perspective, that is, to non-perspective stereoscopic vision. If the binocularly viewed object is one in which there is perspective, apparent changes due to that perspective also result from aniseikonia but they are very much less in degree, so that they can be neglected in many instances. Moreover, these minor apparent changes induced in perspective objects by aniseikonia, especially when the perspective objects are three dimensional, may be inconsistent. This can be explained by referring to Fig. 3 which shows a three dimensional object giving marked perspective stereoscopic vision. This object is a box $k$ held near to the eyes, of a length approximately equal to the distance between the pupils of the eyes which are looking into the box, the normal ocular image being indicated at OL and OR. With this particular arrangement each eye sees in perspective a part of the object which is not seen in perspective by the other eye, namely, the respective side walls SL and SR of the box. The image of one eye, for example the left eye, may now be changed in the horizontal meridian, for example, by means of a no power size lens SL, indicated in dotted lines. Since the parallelism of the edges of the top and bottom and sides of the box and of the front edges of the box are not affected by the size lens these portions will appear parallel and perpendicular to the base line of the eyes. But it is evident that to the left eye with the larger ocular image the back and the front edges of the box will appear longer than they will to the right eye, and that the right-hand side of the box SR will subtend a greater angle to the left eye than the left-hand side OR will to the right eye. As a result, the right-hand side of the box will be interpreted as being nearer than the left-hand side, in which case the box will appear to be tipped as if the right-hand side was nearer than the left, which is inconsistent with the parallelism of the edges of the box. Moreover, the right-hand side of the box appears deeper than the left-hand side. Due to these conditions, if judged from the front edge of the box the back of the box will appear to be tipped as if its right-hand side was further away than its left-hand side; or if judged from the back of the box, the right-hand front edge of the box may appear as though nearer than the left-hand front edge. In other words, the difference in size and shape of the ocular images produces an inconsistent interpretation from the point of view of perspective stereoscopic vision. However, this false interpretation is of a relatively small amount compared with the interpretation produced in non-perspective stereoscopic vision by the same aniseikonic difference. Moreover, perspective stereoscopic vision only exists for near objects where the difference of the point of view of the two laterally separated eyes is marked. It decreases with distance and is entirely negligible beyond a hundred or two hundred feet. The effect of aniseikonia on non-perspective stereoscopic vision not only takes place at all distances, but becomes more marked with greater distances.

In general, where there are perspective features in the field of view they are relied upon by the observer to tell him the position of the objects in the field of view. As such perspective features are only affected in a second or third order by aniseikonic differences, such defects do not have a marked effect on the judgment of interpretation of objective space where there are perspective patterns in the field of view. Moreover, it is possible according to the present invention, to separate the effects of perspective and non-perspective stereoscopic vision, as will be discussed hereinafter.

In order to assure correct perception of the distribution of objects in space (assuming that visual acuity of both eyes is satisfactory), monocularly perspective vision should be as perfect as possible, and normal disparateness of binocular vision should be correct through proper congruence of the ocular images of the two eyes. For normal vision giving optimum correctness of space perception the apparent positions of objects as derived from all factors involved, especially from vestibular orientation, monocular perspective vision, perspective stereoscopic vision and non-perspective stereoscopic vision should substantially conform to one another.

Based on these considerations I determine, according to the present invention, on the one hand the judgment of spatial relations generally as dependent on the relative quality of vestibular orientation and monocular and binocular (perspective as well as non-perspective) vision of a person, and, on the other hand, the conditions of the various types of visual space perception by comparing the actual location of objects with the apparent location thereof as derived from vestibular orientation, monocularly perspective vision, perspective stereoscopic vision and non-perspective stereoscopic vision. According to my invention, I also determine defects of binocular vision or monocular vision by such comparisons of the apparent and the actual positions of objects in space. Assuming vestibular orientation to be substantially correct (it will be shown hereinafter in which manner the correctness of vestibular orientation can be checked according to my invention), and since monocular vision can be corrected with conventional means and then assumed to be substantially perfect, this determination will be directed mainly towards the evaluation of defects of binocular vision.

Since, further, perspective stereoscopic vision is either independent of aniseikonia or can be disassociated therefrom as mentioned above, the comparison of the various kinds of space perception results principally in the evaluation of non-perspective stereoscopic vision as affected by aniseikonia or disparity of ocular images.

According to one aspect of my invention, I determine defects of non-perspective stereoscopic vision, which are mainly due to aniseikonia, by comparing non-perspective stereoscopic vision with any one, or combinations of, space perception derived from vestibular orientation, from monocularly perspective vision, or from binocular perspective vision.

Heretofore, the normality of foveal stereoscopic vision has been investigated by the methods well known for that purpose, and peripheral stereoscopic vision in the horizontal meridian with so-called horopter tests. However, in the latter tests the standard against which the horopter is set is an imaginary plane or surface, the uncertainty of the position of such a standard surface making these tests frequently not very exact. Also, such tests take into consideration only certain horizontal meridians, whereas my new testing method is not confined to any particular meridian, plane, object pattern or visual distance.

In another aspect of the invention, it is possible to find optical means for correcting defects of binocular vision by either changing trial corrections until binocular vision agrees with essentially correct space perception derived from other sources, or by deriving the necessary amount of binocular correction from the apparent deviation of objects, on the one hand as seen with non-perspective stereoscopic vision, and, on the other hand, as perceived in space by different types of space perception which latter may be assumed to be correct.

Still other objects of my invention are to provide methods for presenting to a pair of eyes objects inducing non-perspective stereoscopic space perception in a manner permitting comparison of that perception with the faculty of vestibular orientation; to present for comparison to a pair of eyes objects that induce principally only space perception due to the characteristics of non-perspective stereoscopic vision and to one eye of the pair objects especially conductive to induce space perception due to monocular perspective; to provide methods for presenting for comparison to a pair of eyes objects inducing non-perspective stereoscopic vision, and objects inducing space perception due to perspective stereoscopic vision; to provide a method for detecting and determining defects of binocular vision by comparing the apparently correct positions of objects seen principally with perspective and non-perspective stereoscopic space perception, respectively; to provide means for presenting to a person objects which are seen by one eye or by both eyes with the characteristics determining space perception through perspective, and by both eyes with the characteristics principally inducing non-perspective stereoscopic space perception; to provide apparatus permitting comparison and determination of the relative location of an object inducing mainly perspective space perception with an object inducing mainly non-perspective stereoscopic space perception; to provide methods and means for carrying out such methods for comparing space perception due to the orientation faculty, monocular perspective, perspective and non-perspective stereoscopic vision for different visual distances and planes; to provide means, either optical or mechanical, for changing the relative positions in space of objects that induce mainly perspective perception and objects principally inducing non-perspective stereoscopic perception; and generally to provide methods and means for testing the correct vision of eyes as determined by the comparative properties of orientation faculty, perspective and stereoscopic vision, respectively.

A further object of my invention is to detect and evaluate the presence of ocular image size and shape differences by comparing perspective and stereoscopic vision, to test eyes for the presence of imperfect space perception due to ocular image incongruences, including differences in declination, and to provide means for carrying out such investigations and eye examinations.

As broadly outlined above, my ocular testing method according to the present invention is based on the comparison of various types of space perception, namely vestibular orientation, monocular perspective vision, perspective stereoscopic vision and non-perspective stereoscopic vision.

Different ways of carrying out ocular tests based on such comparisons will now be described, whereby it is understood that various combinations and modifications of such methods are possible within the broad inventive concept of testing space perception by simultaneously effecting, and differentiating between, various ways of bringing to consciousness the position of objects in space. It will also be understood that the herein given theoretical basis of the invention constitutes the best explanation of its practical aspects available to me at this time, but that changes in such theories as might be arrived at by further research will not materially change their practical embodiments herein disclosed and claimed.

For comparing non-perspective stereoscopic vision with the vestibular orientation faculty, an object inducing substantially only such vision is presented to both eyes, by excluding any factors that might induce perspective space perception, either monocular or stereoscopic.

For comparing non-perspective stereoscopic vision with monocular perspective vision, only one eye sees an object inducing perspective vision, whereas both eyes see a correlated object inducing only stereoscopic, but not perspective vision. In this case, ocular image discrepancies do not substantially affect space perception induced by the eye seeing perspectively, whereas they do affect stereoscopic vision; hence they can be evaluated by comparing, in this case, the appearance of objects perceived with monocular perspective and non-perspective stereoscopic vision, respectively.

For comparing non-perspective stereoscopic vision with perspective stereoscopic vision, both eyes are presented with an object inducing only stereoscopic vision, and also with another object which induces perspective, preferably without being affected by ocular image incongruities. Eikonic defects can therefore be examined by comparing the apparent relative position of the two objects. Ways of practically carrying out this comparison will be described more in detail hereinafter.

Figure 4:
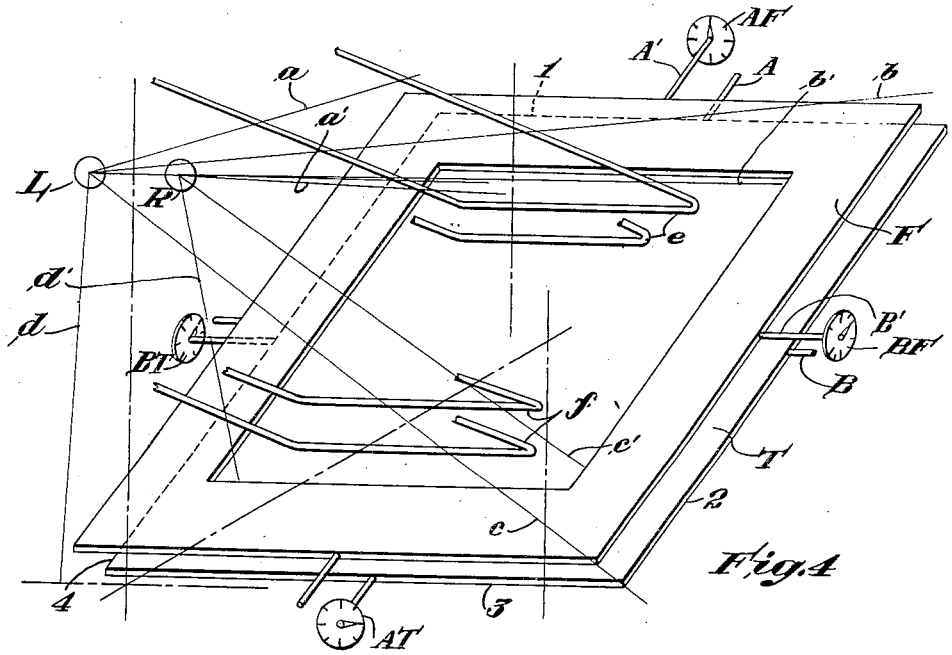
Figs. 4 and 5 are schematical representations of the principle of the present invention, including possible arrangements for carrying out my new test, and its relation to the eyes to be tested, in isometric projection and vertical section, respectively.
Figure 5:
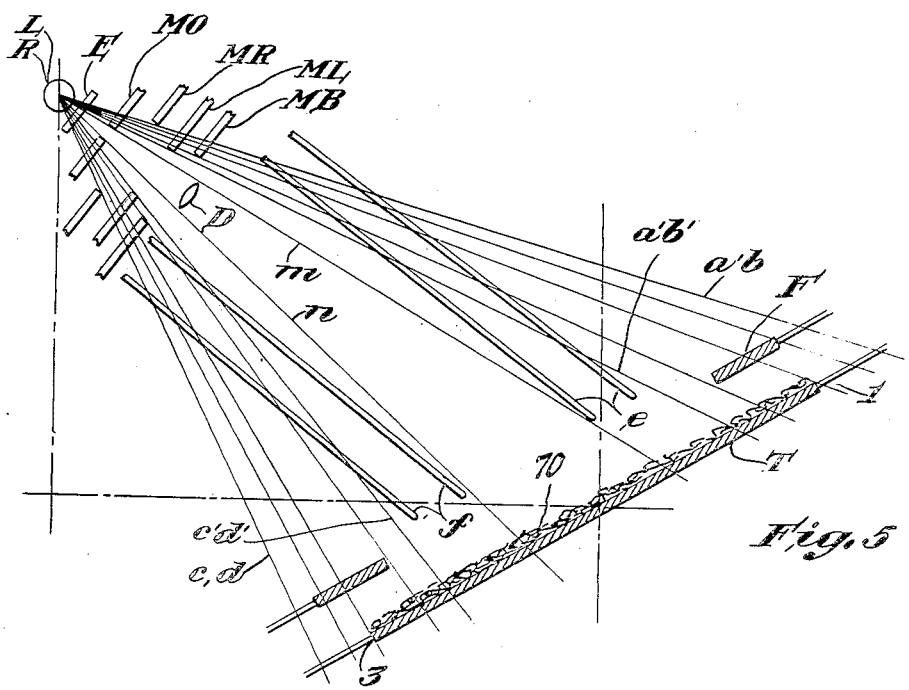

My invention will first be explained with reference to Figs. 4 and 5 schematically illustrating the carrying out of such tests.

In these figures, L and R represent the left and right eye, respectively, of a pair of eyes which are positioned in space by suitable means examples of which will be described in detail hereinafter.

In the field of view of the eyes is arranged an object adapted to induce non-perspective stereoscopic vision, for example, a plate or table T having a surface covered with an irregular pattern 70, preferably raised, or in relief, or otherwise adapted not to produce any effect of perspective that could induce perspective perception. A rough building board or a sheet with metal shavings glued thereto was found satisfactory for this purpose, but it will be understood that any object having the function herein discussed (namely that of a three dimensional pattern sufficiently irregular so as not to induce perspective space perception) can be substituted. Several embodiments of structures inducing only non-perspective stereoscopic vision will be described later with reference to Figs. 7, 8, 11, 12, 16, 17, 18, 21, 24 and 26.

Associated with table T is an object used primarily for inducing monocular perspective space perception. I found that a rectangular frame arranged as indicated at F serves this purpose. As especially shown in Fig. 5, table and frame are so dimensioned, and arranged with respect to the eyes, that the edges 1, 2, 3, 4 of the table are obstructed by frame F, so that the table does not present to the eyes any structure liable to induce perspective space perception.

For inducing perspective stereoscopic vision, three-dimensional rectilinear forms with disappearing lines are especially effective, as for example wires $e$, $f$, of Figs. 4 and 5. Other structures for the same purpose will be described hereinafter.

In certain instances, the configuration of the perspective structure is of no particular consequence. In that case, both eyes may see frame F and a wire structure $e$, $f$, of Fig. 4. Eikonic defects can then be detected and evaluated by moving table T relative to structures F, $e$, $f$, since moving the table changes the stereoscopic perception thereof, but not that of the structure F, $e$, $f$.

In other instances, however, especially if test lenses changing the ocular image relation are to be used, it must be considered that any change of that relation, generally speaking, also affects perspective stereoscopic vision. Hence, in such cases care must be taken to avoid any influence of eikonic changes upon the object of comparison, the perspective object. Two ways of accomplishing this result will be described by way of example, as follows:

If the lenses are to be applied in such a manner that they cover both types of objects, perspective objects must be used that have no lines or forms which are influenced by relative changes of the ocular images. Such objects are, generally speaking, structures which do not have two objects laterally displaced so that their relative separation as seen by each eye could be judged. The wire structure shown in Fig. 27 meets this condition. It consists of a cross $225^a$, $225^b$ normal to the line of vision, whose ends extend beyond the field of view, with a third member $225^c$ placed in the line of vision of the cyclopean eye. This structure must be viewed through diaphragms, for example circular, that prevent the eyes from seeing any other lines or objects whose lateral position can be compared with line $a$.

If the eikonic lenses are applied in such a manner that they cover only the non-perspective stereoscopic object, that is where they can not affect the stereoscopic appearance of a perspective object, the latter may in certain instances have lines and forms that are subject to change of appearance with change of eikonic relations. An arrangement of this type is indicated in Fig. 5, where lens D does not interfere with the visibility of structure $e$, $f$, as indicated by rays $m$, $n$. In this case, the eyes need not be masked, but of course the edges of table T must be hidden, for example, by frame F, in order to render the table a purely stereoscopic test object. The purpose and use of lens arrangements of this type will be described more in detail later.

It will be observed in this connection that the above discussed problem of avoiding the effect of eikonic changes upon a perspective object is not present in the case where monocular perspective is used for comparison with non-perspective stereoscopic vision, since, as above discussed, monocular vision is not substantially affected by eikonic changes; at least any influence of such changes upon monocular vision is of secondary order as compared with their influence upon non-perspective stereoscopic vision.

Instead of being arranged comparatively close to table T, frame F or several frames may be arranged nearer to the eyes, as for example approximately half way between table and eyes. In this case, the surface T will appear somewhat similar to a wall observed through several door frames looking down a hallway.

In order to relate non-perspective stereoscopic vision and vestibular orientation, all objects inducing perspective must be excluded, as explained before. For this purpose, screens MO may be placed in front of each eye, which screens, as indicated in Fig. 5 obstruct frame F to both eyes, so that nothing but non-perspective stereoscopic vision is present.

For comparing non-perspective stereoscopic vision with monocular perspective vision, the following structures are used. In order to induce monocular perspective vision of frame F, means are employed to obstruct to one eye the entire frame F, so that only the other eye can receive the impression of perspective. As indicated in Fig. 4, the left eye L can see everything within the sector indicated by lines $a$, $b$, $c$, $d$, whereas the right eye R can perceive objects within sector $a'$, $b'$, $c'$, $d'$ (Fig. 5), in the present instance only table T. This effect can, for example, be accomplished by placing in front of the right eye a rectangular mask MR (Fig. 5) whose aperture sides are defined by rays $a$, $b$, $c$, $d$, and in front of the left eye a mask ML similarly defined by rays $a'$, $b'$, $c'$, $d'$.

In most practical embodiments of this phase of my invention, it is not necessary to present to one of the eyes only the test object inducing monocular perspective vision, to the exclusion of objects not part of the testing apparatus. It is then not necessary to limit the vision of the eye (here the right eye R) perceiving the test object (here frame F) so that mask MR, or equivalent means, can be omitted and the eye permitted to see the environment of the test set-up which, generally speaking, will likewise induce monocular perspective space perception.

For comparing perspective and non-perspective stereoscopic vision by excluding the influence of eikonic changes upon the perspective objects, both eyes are screened, for example with masks MB, from seeing frame F, so that, as above discussed, they see, respectively, only table T inducing stereoscopic vision, and a structure, inducing binocular perspective not influenced by eikonic changes.

As indicated in Figs. 4 and 5, both frame F and table T may be arranged for universal rotatory adjustment about axes A, B, and A', B', respectively, so that they can be moved into any desired position, preferably by the person being examined. In most instances, it is not necessary to change the position of frame F, so that it may be fixed and only table T fitted with adjusting means.

Specific examples of such adjusting means will be given hereinafter, but care should be taken in every case where the patient himself operates them, that the instrumentalities for moving the test objects do not convey any indication of the position of the latter through judgment based upon sensory cues derived from such instrumentalities.

The position of the test objects at any time can be indicated, for example, by scales shown at AT, AF, BT and BF of Fig. 4, with appropriate indicators.

The first-mentioned test of comparing non-perspective stereoscopic vision with the vestibular orientation faculty is, for example, very valuable for examining the sight of aviators, and if so applied, the test should duplicate as nearly as possible the conditions under which a pilot's eyes are used when flying, particularly when landing. The test is preferably made with a horizontal table which can be tipped to any angle. The person to be tested looks down on the table at the average angle of observation of a landing field. The table, for example irregularly marked with metal shavings, is preferably at a distance of about 15 to 20 feet. As mentioned before, both eyes are screened so that they see only the table and no object whatever that could induce perspective vision. It will be understood that, if only this type of test is to be performed, there is no need of using frame F and wire structure e, f, and that only table T, in combination with a head support (for example as described hereinafter) and a mask MB for each eye are necessary.

The aviator is so positioned that the masks present only the table surface, without its edges, and by suitable means (such as described hereinafter) he sets the table in a position that appears level to him. If his stereoscopic vision is good, the table as set will be actually level; if not, the table will be set at angles which indicate the person's defects in a manner which will be discussed hereinafter in connection with other modifications of my test which, however, are in this respect similar to the one now discussed.

The above test is based on the assumption that vestibular orientation is substantially correct, and it is therefore desirable to check or test whether or not this is actually the case. According to my invention, a test for that purpose can be carried out in the following manner.

In addition to being subjected to the above described test involving comparison between vestibular orientation and nonperspective stereoscopic vision, the person in question is also put through a test during which monocular perspective vision and non-perspective stereoscopic vision are compared.

I found that space perception induced by monocular perspective is least influenced by uncontrollable factors and can therefore be used as a standard. Hence, although vestibular orientation and monocular perspective can not be directly compared, by relating non-perspective stereoscopic vision to both vestibular orientation and monocular perspective vision (this test will be described in detail hereinafter), the former can be indirectly related to the latter, and in this manner checked against a substantially fixed standard. If the results of both tests are in agreement, it can be assumed with practically sufficient certainty that vestibular orientation is correct. Any difference between the results of these two tests indicates defective vestibular orientation.

Coming now to the comparison of non-perspective stereoscopic vision with monocularly perspective vision, effected by table T, frame F (structure e, f, being removed) and masks ML and, if desired, MR, it will now be evident that a person whose eyes are located at L and R and masked by MR and ML sees table T with both eyes, neither eye being able to see the boundaries of the table. Therefore, the table produces substantially only non-perspective stereoscopic space perception induced by its pattern, as for example a rough surface or one of the structures to be described hereinafter. The frame F can be seen with one eye only, here with the left eye. Hence, the position of the table surface will be known to the observer mainly through his non-perspective stereoscopic faculty, whereas the frame position is determined principally through the perspective of its image as received in one eye.

Any non-conformity in the nature of the two types of vision is made evident by a non-conformity in the position of the object for non-perspective stereoscopic space perception (here the table T) as compared with the position of the object conveying monocularly perspective space perception (here the frame F appearing in rectilinear perspective).

Therefore, if the person examined suffers from non-conformity of monocular and stereoscopic vision and looks at a structure exemplified by Figs. 4 and 5, with the planes of frame and table set parallel, he will not see these two structures as parallel, but obliquely to one another. If now, by some means, the patient relatively moves the two structures until they appear to him parallel, his visual defect can be determined from the deviation from actual parallelism of the structures, which can be measured, for example, by means of the above described scales indicated in Fig. 4. Or, the visual defects can be determined by placing test elements, indicated at E of Fig. 5, before the eyes which cause the objects to appear in correct position. The test elements then indicate not only the nature of the defect but also its amount, and can be used directly to determine the design of spectacles for correcting the defects. Assuming correct or corrected monocular vision, such lenses (whose structure and specific mode of operation is not a subject matter of the present disclosure) will consist of elements changing the relation of size or shape (including declination and distortion as above discussed), or both, of the ocular images, alone or in combination with one another or with power elements.

Although, as already discussed, defects of non-perspective stereoscopic vision caused by incongruous ocular images are the principal cause of incorrect space perception generally, and although, in the specific embodiments to be described below, only the object inducing non-perspective stereoscopic vision is shown adjustable and the object inducing another type of space perception and serving as a standard for comparison, remains fixed so that visual separation thereof from the environment is not necessary, the relative adjustment of the two types of objects may be performed in any other manner. Accordingly, both objects F and T are shown movable in Fig. 4. If the object for monocular perception (for example F) is to be adjusted, it is preferably disassociated from the environment. Thus, Fig. 5 shows a mask MR which performs this function.

In order to carry out the third above-discussed modification of my invention, namely the comparison of non-perspective stereoscopic and perspective stereoscopic vision, the outlines of the table (or whatever structure is used to induce non-perspective stereoscopic vision) are preferably screened from both eyes, although this is not necessary in all instances. Masks similar to MB of Fig. 5 may be used for this purpose, and frame F may be removed. The object inducing only binocularly perspective vision, as for example wires e, f, of Figs. 4 and 5, must be so arranged and supported that any structure associated therewith that might induce stereoscopic vision can be screened from both eyes. Various ways of accomplishing this result will be described hereinafter.

Again, as in the example dealing with the comparison of non-perspective stereoscopic and monocularly perspective vision, the two test objects are actually moved relatively to each other by mechanical means, or apparently by means of suitable optical elements, as prisms or size lenses, until they assume a desired apparent relative position. It is, generally speaking, preferable to adjust the position of the non-perspective stereoscopic test object and to retain the object of comparison fixed.

In evaluating ocular defects by means of corrective lenses, it is preferable to use such lenses before the eye which is not used for monocular perspective vision, in order to eliminate any possibility of secondary influences of an ocular image change upon monocular perspective.

While the comparison of stereoscopic vision with three other types of space perception has been discussed separately, it will be understood that these test modifications can be combined in various ways.

As mentioned above, various means for inducing stereoscopic vision may be used, an irregularly rough surface, as for example, metal shavings glued to a board being satisfactory in many instances. However, for certain tests it is desirable to use stereoscopic test objects which can be related to certain physiological facts which will now be shortly described.

As well known in physiological optics, the horopter is the surface in space every point of which is imaged on corresponding retinal points, whereby "retinal" includes the above-mentioned corresponding elements of retina and brain which are associated through nerve connections. However, due to the so-called "fusion areas", a pair of eyes, fixed at a certain point is able to fuse objects within a certain space outside the horopter.

Expressing this condition in terms of horopter theory, it can be said that the horopter is surrounded by a spatial region of single vision, or, referring now to Fig. 6 (where R and L are the two eyes, respectively, h the longitudinal horopter in the visual plane, FP a fixation point, tm the trace of the median plane and tf the trace of the fixation frontal plane on the plane which includes the visual axes), that the longitudinal horopter h is flanked by two lines ho and hi enclosing an area of single binocular vision or fusion.

It will now be apparent that a three-dimensional pattern to be used for inducing stereoscopic vision should on the one hand lie well within the fusional area, but also, on the other hand, should sufficiently extend in the direction of the line of vision to induce space perception. In Fig. 6 the area of such a pattern, assumed to be limited by plane surfaces, is indicated at r and s. Since the fusional area varies considerably with different individuals, I use, according to my invention, stereoscopic test patterns which can be adjusted to conform to the fusional area of different individuals. For example, referring now to Fig. 7, irregular patterns, as spots of paint O, may be applied to glass plates 20 and 30 which are mounted parallel and whose distance can be adjusted by suitable means, an embodiment of which will be described hereinafter. Or (Fig. 8), a two-dimensional pattern O' may be applied to a transparent medium and rendered three-dimensional with the aid of a mirror 40 producing a virtual image of pattern O' at O''. Object O' and image O'' together represent a three-dimensional pattern whose extent in the direction tm (Fig. 6) can be adjusted by changing the distance between object O' and mirror 40.

Certain ocular image differences, mainly those of an asymmetrical order which can be reproduced by prism effects, cause the stereoscopic vision objects, for example, table T to appear warped. According to one aspect of my invention, I examine and evaluate this effect by warping the table to compensate for this defect, the amount of warping necessary being a measure of the defect.

For this purpose, the table may be arranged as shown in Figs. 9 and 10. In these figures, 9 represents a rigid plate, for example supported on a ball and socket joint 6 and stand 7. Attached to rigid plate 9 is a flexible table 8, by means of spacers of adjustable length connecting a number of corresponding points of plate and table. Any suitable means for adjusting the spacers may be used, Figs. 9 and 10 showing screws 9ª attached to the table with ball joints 10 and turning in nuts 11 fastened to plate 9. By means of flexible shafts 12 and hand knobs 13, the lengths of the respective spacers can be adjusted, and their amounts read by means of scales 14. By mounting knobs 13 on a board 15 (Fig. 10), near to the observer's position, and by distributing them similar to the spacers, the arrangement of the testing table can be reproduced on a smaller scale. It will now be apparent that by applying a suitable number of adjustable spacers, table 8 can be warped into any shape, and the configuration of the warped surface measured, and hence also the nature of an eye defect which causes a plane surface to appear warped and which can be compensated by actually warping the surface.

It is understood that other means, suitable for the peculiar arrangement required, can be used for adjusting the test table surface.

Although arrangements similar to Figs. 4 and 5 permit the carrying out of my new testing method with respect to deviations in all three dimensions, and are particularly applicable to investigations of binocular vision in reading position (to be described more in detail hereinafter), I found it in many cases more desirable to separate the tests for the two main object planes, namely the horizontal plane and a vertical plane substantially perpendicular to the line of vision. This separation not only permits more exact determination of the correlation of ocular defects and corresponding object appearances, but it also simplifies tests in cases where objects appearing mainly on a certain plane are of principal importance.

An instrument especially suited for investigating the perception of objects mainly in a horizontal plane, or deviations about horizontal axes, will first be described with reference to Figs. 11 to 15.

Instruments of this type are especially valuable for testing aviators for their stereoscopic vision, either by comparison thereof with the vestibular orientation faculty, as above explained, or any other method according to my invention. They duplicate in essence the conditions under which pilots use their eyes when flying, particularly during landing. The general arrangement is so that the aviator looks down on an approximately horizontal test table at the average angle of observation of the ground when landing. The table is preferably placed at a comparatively great distance, for example 15 to 20 feet, although shorter distances may be used.

As shown in Figs. 11, 12 and 13, a stand 16 is provided (which may be placed on a raised platform in order to obtain the proper angle of observation) carrying eye positioning means 17, for example of the type described in copending application Serial No. 706,523, filed January 13, 1934, or of any other suitable construction. In the present embodiment, a slotted bracket 18 supports an arm 19, which can be laterally adjusted, for example by means of screw 21. Clamped to a slotted sleeve of arm 19 is a column 22 which supports at its upper end a chin rest 23 and a forehead support 24. As shown in Fig. 12, support 24, after loosening screw 25, can be rotated about column 22 and also adjusted vertically. Extension 26 and screw 27 permit a tilting of support 24. With a nut 28 the threaded and slotted spindle 29, and with it chin support 23, can be raised and lowered.

It will be understood that by this, or similar means, the head of a patient can be fixed relatively to the testing means and that by using appropriate scales, as for example described in the above-mentioned copending application, any head position can be reproduced for future tests.

Also supported by column 16 is an optical head 31. This structure can be tilted by means of a joint 32 and fixed in any desirable position by tightening screw 33. Extension 34 slides within column 16 and can be fixed thereto at any height and angular position with screw 35. The head 31 proper has a base 41 on which are mounted corneal sights 42 which are merely schematically indicated in Fig. 12 and may be of any desirable type, for example as described in the above-mentioned copending application. Lens holders 43 are fastened to base 41 as shown more in detail in Figs. 14 and 15. One holder is provided for each eye and each preferably slides on the base independently of the other with dovetail keys 44. Screws 45 rotatably fastened in rim 46 of base 41 (Fig. 14) and engaging a thread in key 44, serve for adjusting the lens holders to the pupillary distance of each individual patient. Mask holders 47 are similarly fastened to base 41 and adjustable with screw 48 (Fig. 12). The lens holders have grooves 49 for receiving trial lenses in a well-known manner. Provisions for continuously adjusting the image size, according to copending application Serial No. 713,701, filed March 3, 1934, may be added.

It will be evident that any suitable construction can be employed for adjusting optical head and lens holders and that indicators and scales can be associated with these structural elements in order to measure and reproduce their various adjustments.

A separating wall or septum 51 is arranged approximately midway between the eyes. As shown in Fig. 12, septum 51 has a cutout which permits both eyes to see both sides of the table, but not of the frame. A septum insert 51ª may be slidably fastened to 51 so that edge 51ᵇ can be moved in accordance with changing conditions of eye position and test objects. Screens or masks 52 are provided between respective eyes and test objects. These screens can be adjusted for proper pupillary distance and may be removable and interchangeable for screens of different apertures, for carrying out different phases of the test herein described. For example, there may be one screen in front of one eye only, corresponding to mask ML of Fig. 5, or one of two screens with two apertures functioning as indicated at MO, MR and ML of Fig. 5. These screens or masks may be mounted adjustably and with indicators and scales, in a manner needing no further explanation.

At a suitable distance from optical head 31 is arranged a frame support 60 having, for example, four posts 61, 62, 63, 64 (Fig. 11) supporting a frame 65 corresponding to, and dimensioned according to element F of Figs. 4 and 5. A frame structure 71 having two trunnions 72 is journaled in uprights 73, 74 or similar supports. Frame 71 supports table 75 having two shaft portions 76, 77 extending into frame 71 in which they are journaled. Table 75 corresponds to element T of Figs. 4 and 5 and, as explained with reference to these figures, has applied to its surface a three dimensional pattern, indicated as shavings 70. For moving table 75, the following arrangement is provided. A drum 81 (Fig. 11) with hand wheel 82 is journaled on stand 16. Ropes or chains 83, 84 are fastened to the drum and guided over rollers 85 (Fig. 12), toward frame 71 to which they are suitably fastened. A similar, in this instance smaller, drum 86 with hand wheel 87 is journaled on stand 16 perpendicular to drum 81. A rope 88 is wound around drum 86 and, over guide rollers 89, conducted towards table 75 to which its ends are fastened. It will be evident that operation of hand wheel 82 swings table 75 about trunnions 72, whereas operation of hand wheel 87 rotates the table about shafts 76, 77. Hence, the table can be brought into any possible inclined position. Hand wheels 82 and 87 being arranged at an angle, and drums 81 and 86 being of different diameters, the patient setting the table can not in any way connect the amount of travel of the hand wheels with the amount of displacement of the test object, which is important for reasons discussed above. Instead of supporting the table as above described, it may be mounted on a ball socket approximately at its center, with moving means, as ropes, or rods, attached directly to the table.

In order to measure the position of the table, trunnion 77 has an indicator 91 playing on a scale 92 fastened to frame 71 (Fig. 13). Similarly a pointer 93 is fastened to frame 71 and associated with scale 94 connected with frame structures 65, for example fastened to post 62 (Fig. 12). With the aid of these two pairs of scales and pointers, the position of table 75 can be accurately determined. If desired, the scales can be calibrated directy to indicate eye defects involved in per cents of size defects, and, for declinations (this concept will be explained hereinafter), in inclinations of the axis of a cylindrical size lens correcting the declination.

In order exactly to determine the spatial relation of the eyes to be tested and the testing objects, stand 16 and posts 61 to 64 may be fastened to the ground in predetermined positions (Fig. 11), or they may be correlated by suitable adjusting members, as for example trucks running on common rails with scales or similar means suitable for adjustably but positively relating the positions of eyes and test objects (not shown).

Apparatus for testing the perception of objects preponderably in a vertical plane, or the vertical aspect of space perception, is shown in Figs. 16 and 17. In these figures, 101 is a base supporting a frame structure 102 and a turntable 103. Pivotally supported in frame 102 is screen 104. Fixed to the ground, or to base 101, is a frame 105. It will be understood that screen 104 and frame 105 correspond to elements T and F, respectively, of Figs. 4 and 5, and are to be arranged and dimensioned in accordance with the principles discussed in connection with these figures. Suitable means for adjusting screen 104, and for measuring such adjustments, should be provided. For example, the ropes shown in Fig. 11 as controlled by hand wheels 82 and 87 can be connected to the vertical testing apparatus as shown in Figs. 16 and 17. In these figures ropes 83 and 84 are fastened to top and bottom of screen 104, whereas rope 88 is slung around the upper disk of turntable 103. It is evident that this arrangement permits universal adjustment of screen 104. The movements of the screen can be determined by scales 111 and 112 on upper turntable disk and frame 102, respectively, which are associated with indicators 113 and 114 on the lower turntable disk and the pivot of screen 104, respectively.

Again, optical head 31 (Fig. 12) and test objects can be interrelated in space by fastening them to the ground, or by means for positively and measurably moving these two units relatively to each other.

If the latter embodiment is used, for example by mounting the test objects on rails, the set up can be so arranged that the two types of objects can be interchangeably used with the same head support and optical head, by positively and reproducibly positioning each object relatively to the eyes to be tested. In this manner, it is possible to correlate in a single test what may be called the horizontal and vertical aspects of space perception.

It will be understood that a test object structure according to Figs. 4 and 5, that is one having no special position in space, will be used in combination with head support and optical means shown in Fig. 12. In this case, both frame F and table T are mounted on means functioning, for example, similar to those shown in Figs. 11 and 12. Both adjusting and measuring means for frame F are quite similar to those of table T, as will now be understood without further explanation.

With apparatus of this type, that is with both objects (that for stereoscopic and that for perspective space perception) universally adjustable, investigations of the interrelations of space perception due to the faculty of vestibular orientation, monocular perspective, and perspective and non-perspective stereoscopic vision, and of the characteristics and defects of each type of perception, can be carried out in a quite comprehensiver manner.

While the above-described embodiments can be adapted for performing ocular examinations at any desirable visual distance, I found devices similar to that now to be described suitable for performing tests at near distance and especially for reproducing conditions during reading, for purposes where no particular exactitude of measurements is required. Figs. 18 and 19 show a device of this type which may either be held in the hands of the patient like a book, or supported on a stand, table or other suitable structure. It has a box-like body portion 121 with a rectangular opening 110 in its upper wall which is preferably covered with the marginal portion of a sheet of printed matter, or a picture, or other object 122 adapted to induce perspective space perception and at the same time simulating matter that is usually viewed at near distance. Within the box is adjustably mounted a sheet 123 of material having an irregularly rough surface inducing stereoscopic space perception. Any suitable device, as universal suspensions similar to those shown in Figs. 11 and 12 in connection with screws, racks and pinions, etc., may be used for adjusting the relative position of sheet 123 and box surface 122. In Fig. 19, sheet 122 is supported by a swivel stick 124 with a ball shaped portion 125 sitting in perforated socket 126 of the box, against which it is frictionally pressed by a rubber or other elastic plate 127. By appropriately moving handle 128 of the stick, sheet 123 can be moved in any desired relation to the box. Scales for measuring the adjustment in any direction can be added in a manner similar to that shown in Figs. 11 to 13 or in any other suitable way.

The protruding length of handle 128 may be made adjustable, for example, by using a sliding handle fastened to stick 124 with screw 129. By changing the leverage of the handle, visional and other means of space perception can be disassociated. In addition, handle 128 may be bent, for the same purpose. A device of this type may either be used in connection with a head positioning means as shown in Fig. 12, or without such arrangements. In the latter case, the patient is fitted with masking spectacles or similar means, as shown in Fig. 20. This figure shows a conventional trial frame 141 fitted before one eye with a mask 142 having a rectangular aperture 143 which is so proportioned that it screens marginal portion 122 of box 121 from the respective eye which, in this manner, contributes only to non-perspective stereoscopic space perception, whereas the other eye sees also the characteristics of frame 122 which induce monocular perspective space perception. The box is so placed on a support, or the patient instructed to hold it in such a manner, that its relation to the eyes corresponds to that shown in Figs. 2 and 3, which needs no further explanation.

Assuming that frame 122 and plate 123 are initially set parallel, if the patient's space perception is imperfect, he reports that they are inclined relatively to each other; he can then be instructed to move handle 128 until both objects are parallel, whereupon the defect can be evaluated with the aid of indicators or scales. Or, suitable optical test corrections can be placed in frame 141 as indicated at 145 and 146.

As pointed out before, correct space perception can be established, and the defects measured, by placing before the eyes test corrections comprising, for example, size changing lens elements according to Patent No. 1,933,578, but preferably adjustable eikonic lens units according to copending application Serial No. 713,701, filed March 2, 1934. Such elements are not necessarily performing functions substantially equivalent to the mechanical adjustment of the test objects, but rather eliminate the ocular image defects, which constitute the cause of the effects demonstrated according to the new testing methods.

An instrument embodying most previously discussed features, and primarily intended for near tests but easily adaptable for distant tests, is shown in Figs. 21 to 29.

This instrument, in the modification shown, has a base 150 to be set upon a table or fixed to a suitable support, and a front piece 151 for mounting head rest, test supports and masks. In order to simplify the drawings, only a chin rest 152 (Fig. 22) is shown, but it is understood that a universally and reproducibly adjustable head support as previously described will be used in most cases. Also for the sake of simplicity, only a comparatively simple lens and mask holding arrangement is shown. It comprises two brackets 153, 153' drilled for four rods 154 to 157 with suitable handles 158 moving therein with some friction so that they remain in any position in which they are set.

Fastened to rods 154 and 156 are trial lens holders 161 and 162, each, for example, accommodating two trial lenses. Rods 155 and 157 support mask holders 163 and 164 to which masks 165 and 166 are fastened. By adjusting rods 154 to 157 in their brackets, lens holders and masks can be adjusted to fit the pupillary distance of the eyes. By rotating rods 155 and 157, any one or both masks can be removed from the field of vision, as for example, in Figs. 21 and 22. It will be understood that more elaborate and exact lens and mask supporting means can be used, and especially that adjustable size lens units according to the above-mentioned copending application, Serial No. 713,701, can be mounted. Also, means for aligning the eyes, including cornea sights, as shown in copending application Serial No. 706,523 will be used in most instances in connection with the head-positioning means.

A slanting board 171 has a slot 172 for a screw 173 with thumb nut 173' adjustably holding in place flange 174 of frame F. In order to induce perspective space perception, window 176 of frame F may be surrounded by a molding 176 (Fig. 23). An exchangeable paper mask 177 may be used for adjusting the size of the window.

Rotatably fastened to board 171, as by means of a pin 181, is a U-shaped (Fig. 24) support 182 for test screen T, which swings in support 182 by means of screws 183, 184, which also permit fixation of the screen at any inclination relatively to the U support. It will be apparent that by means of pivot 181 and screws 183, 184, screen T can be rotated about two axes and hence brought into any possible angular relation to the line of vision. Means suitable for conveniently moving screen T about those two axes may be added, as for example, hand wheels and ropes attached to the screen and running over pulleys to the hand wheels. The position of screen T can be determined with the aid of two circular scales 186, 187, fastened to board 171 and screen T, respectively, and two pointers 188, 189 on support 182.

The screen is of the adjustable type explained above with reference to Figs. 6 to 8, and comprises two frames 191 and 192 holding glass plates 193 and 194, respectively, with a pattern applied to their surfaces. The two frames are spaced by four pins 195 fastened to frame 191 and movable in bushings of frame 192, for example, by means of rack and pinion drives shown in Figs. 21 and 25, and permitting easy adjustment of the plate distance by turning knob 199.

The screen is illuminated from behind by means of a lamp arrangement comprising a board 201, a reflector 202 and a lamp 203. In the instrument shown, the rear plate 194 is an opal plate having a pattern on the inner surface, whereas plate 193 is transparent and has a similar pattern, likewise on the inner surface. Instead, two transparent plates and a diffusing surface covering reflector 202 could be used.

For carrying out tests with correlation of binocular perspective and stereoscopic vision, a perspective structure may be applied as follows, although frame F (Figs. 4 to 21) alone is often sufficient for that purpose.

Referring now especially to Figs. 26 to 28, a box-like frame 211 is mounted on board 212 which can be put against frame F, with the portion 214 of the box extending into the frame window. Within the box are four sheets 221, 222, 223, 224, forming a perspective structure which, if desired, can be supplemented by a wire frame 225 which constitutes the above described perspective structure which is not influenced by relative changes of the ocular images.

For making tests with lenses affecting the ocular image relation and not covering the perspective pattern, the following, or similar provisions, may be made, referring now especially to Figs. 26 and 29.

A standard 231 is adjustably fastened to board 171, for example, with a screw clamp 232 permitting adjustment of the standard in the plane of board 171 by changing the position of clamp base 241, as well as perpendicularly thereto by means of a rack and pinion arrangement 242. A boss 233 of standard 231 rotatably supports rod 234 which has a similar boss 235 holding rod 236 for lens holder 237. Knobs 238, 239 permit rotation of lens $l$ in lens holder 237 about two perpendicular axes intersecting at its center.

By way of example, some effects of aniseikonia as evaluated with the aid of my new testing method will now be described. If meridional aniseikonia is present in the form where the ocular images are different in the horizontal meridian, the two ocular images are related as diagrammatically indicated in Fig. 30. In this figure, it is assumed that the ocular image IL of the left eye is an undistorted reproduction of an object field represented by a square, whereas the ocular image IR of the right eye has greater horizontal dimensions than IL. I found that to a patient having this defect, the two test objects of apparatus according to Figs. 2 and 3 seen with perspective (either monocular or binocular) and non-perspective stereoscopic vision, respectively appear laterally inclined as shown in Fig. 31, where FH and T indicate the actual normal positions of frame and table, respectively, whereas T1 indicates the apparent position of table T. Fig. 31 is a front view of the table T in Fig. 12 seen in the general direction of the patient's line of vision, as indicated by the axes which are marked A and B like the corresponding axes of Figs. 4 and 5. If the patient adjusts the table until it appears to him horizontal and parallel to frame FH, it will assume position T2.

Figure 32:
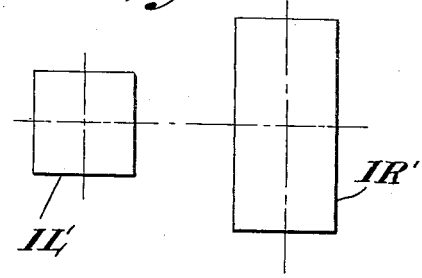
Figure 33:
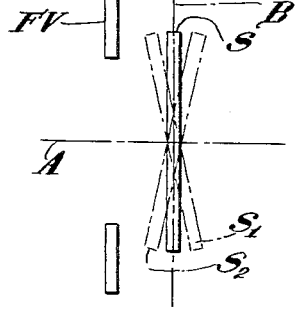

Figs. 32 and 33 indicate similarly the effect of aniseikonia in the vertical meridian, where the vertical dimensions of ocular image IR' are greater than those of the other ocular image IL'. Fig. 33 is a top view of the vertical testing screen.

Theoretically, an image difference of this type should have no effect on stereoscopic space interpretation, because the disparity is not in the direction of the separation of the eyes. It was found, however, that an artificially produced increase in the vertical meridian of one eye does effect the apparent lateral tipping. The amount of this effect on observers who have no vertical size difference is as if the horizontal meridian of the other eye were increased by about half of the vertical size change in the first eye provided the test is made with the horizontal tilting table at a distance of about 4½ feet. Referring to Fig. 31, this would mean that the horizontally placed table would appear between T and T₂. If these tests are made at reading distance with the eyes in reading position looking down at an angle of about 20° at a tipping table approximately perpendicular to the line of sight, the above amount of this effect is not approximately one-half of the vertical size change, but about equal thereto. I have also found that an observer having a vertical size difference does not observe a corresponding lateral tipping if his vertical aniseikonia is corrected with a size lens, which phenomenon permits the determination of vertical size differences.

The effect of meridional aniseikonia on a vertically placed test screen is analogous. An image disparity according to Fig. 30 apparently tips a vertical screen about a vertical axis in the median plane of the head, perpendicular to the plane of the visual axes. Referring to Fig. 33, a vertical screen S, in normal position parallel to frame FV of a device according to Figs. 16 and 17, appears inclined as indicated at S1 of Fig. 33, this figure being a top view seen perpendicularly to the patient's line of vision, as indicated by the axes which are marked to correspond with Figs. 4 and 5. If the patient adjusts the screen until it appears vertical and parallel to frame FV, it will assume position S2.

Figure 30:
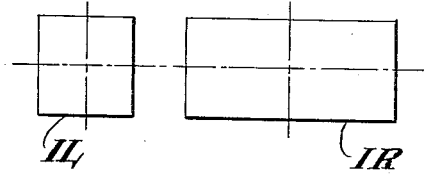
Figure 31:
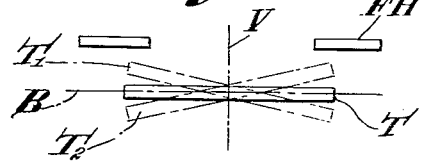

Again, aniseikonia as indicated in Fig. 30 has theoretically no influence upon the perception of a vertical test object as represented by Fig. 33, but an induced effect analogous to that described with reference to the horizontal screen.

Ocular image incongruities involving declination differences cause faulty interpretation of the distribution of objects in space which can be tested according to the present invention as follows: As explained hereinbefore, with reference to Fig. 1, this defect is caused by an anomaly of the declination of the eyes. In the case of disclination, indicated in Fig. 34 with vertical meridians VM and horizontal meridians HM, the near end of a horizontal plane or table T appears tipped downwardly, as indicated at T₃ in Fig. 35, which is a side view of a test structure, for example, similar to Figs. 4 and 5. If the table T is moved into position T4, it will appear parallel to the frame FH. The top of a vertical screen will appear tipped away from the observer, as indicated at S₃ in Fig. 36. In the case of conclination, indicated in Fig. 37, the top of a vertical plane would appear tipped toward the observer, as S₄ of Fig. 36, while the near end of a horizontal plane appears to be tipped upwardly as T₄ in Fig. 35.

In addition, the test plane appears nearer to the observer in the case of conclination, and farther away from the observer in the case of disclination.

Figure 34:
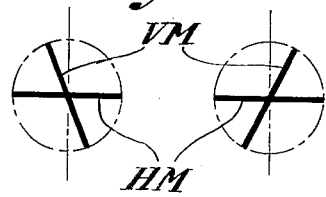
Figure 35:
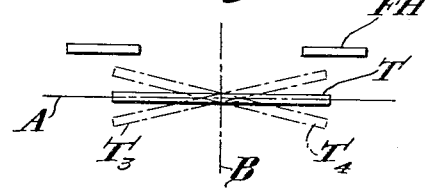
Figure 37:
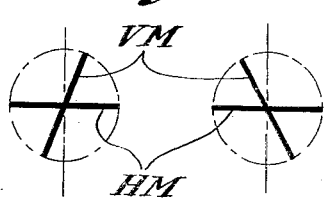
Figure 36:
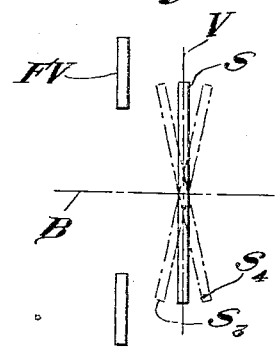

In accordance with the above discussed fact that declination aniseikonia is analogous to the effects of lenses changing the meridional image size without affecting vergence, defects as indicated in Figs. 34 and 37 can be corrected by means of meridional size lenses with inclined axis of symmetry, and such lenses can be used to measure and correct defects, or defect components, indicated by apparent test object deviations as for example shown in Figs. 35 and 36.

For correcting defects as indicated in Figs. 30 and 32, meridional size lenses with horizontal or vertical axes of symmetry can be used.

It will be understood that a patient may have any or all of these and other defects, which will then influence space perception in a manner that can be deducted from the characteristic effects of the various defects. For example, a person having a combination of the defects illustrated in Figs. 30 and 34 will see table T tilted approximately about a diagonal thereof. It will also be understood that combined ocular defects of this nature can be separated into their component errors by detecting and measuring each component separately and then checking the combined effect of the component errors or corrections which should substantially correspond to a satisfactory total correction or defect.

The above discussion covers the comparison of space perception in two different ways by separating, on the one hand, the vestibular orientation faculty or perspective (either monocular or stereoscopic) vision, or both, and, on the other hand non-perspective stereoscopic vision, and it was assumed that test or corrective lenses are applied as indicated at E of Fig. 5, that is, lenses covering a field including both types of test objects. As discussed above, test lenses can also be applied to cover only the object inducing non-perspective stereoscopic vision, a testing device for carrying out this test being, for example, illustrated in Figs. 26 and 29. The effects of this test may be illustrated by the following examples of a few phases thereof.

If the ocular image size relation is altered by putting a no-power lens changing the overall magnification (as for example shown in Patent No. 1,933,578) before the left eye in such a way that perspective vision is not interfered with, that area 210 (referring now to Fig. 38) of the stereoscopic screen T which is covered by the lens 220 appears to the observer in binocular vision tilted about a vertical axis as indicated at 210', Fig. 28 being a top view. The tilting angle depends upon the amount and algebraic sign of the magnification.

If an asymmetric distortion, mentioned above as for example described in copending application Serial No. 750,162, is introduced by a prismatic lens 230 before one eye, for example, the right eye as indicated in Fig. 39, the portion 240 of the screen which is covered by the prism 230 appears in binocular vision parallel displaced at 240'. Amount and algebraic sign of the displacement depend upon prismatic power and position of the prism lens.

Considering the selection of the one eye to which the object inducing monocularly perspective space perception is presented in the respective embodiments of my invention, no general rules can be given for this selection; however, I found it in many cases advantageous for a more accurate determination of the position of objects through monocular rectilinear perspective if the observer's dominant eye is the one receiving the characteristics inducing monocular space perception.

It should be understood that the present disclosure is for the purpose of illustration only and that this invention includes all modifications and equivalents which fall within the scope of the appended claims.

I claim:

1. A device of the character described for testing space perception of a person, comprising a base, mounted on said base a test object having a three dimensional irregular pattern preponderantly inducing non-perspective space perception, associated with said base means for positioning the person relatively to said object for binocular observation thereof, means for rotating said object, about at least one axis, relatively to said positioning means to adjust said object until it appears to the person in a predetermined position, and means for adjusting the dimensional relation of the ocular images of said object to compensate discrepancies of the apparent and actual locations of said object, indicative of defects of binocular vision.

2. A device of the character described for testing space perception of a person, comprising a base, mounted on said base a test object having a three dimensional irregular pattern preponderantly inducing non-perspective space perception, associated with said base means for positioning the person relatively to said object, for binocular observation thereof, means for rotating said object, about at least one axis, relatively to said positioning means, a shield conforming to the outlines of said test object, and means for placing said shield with respect to said object in a position to mask said outlines from observation by the person, said rotating means having the purpose of adjusting said object until it appears to the person in a predetermined position, discrepancies between apparent and actual location of said object indicating defects of binocular vision.

3. A device of the character described for testing space perception of a person comprising supporting means, a test object adjustably mounted on said supporting means having a three dimensional irregular pattern preponderantly inducing non-perspective stereoscopic space perception, a second test object on said supporting means adjacent to said first object and having definite outlines shaped preponderantly to induce perspective space perception, means associated with said supporting means for positioning the person to be tested relatively to said objects for simultaneous observation thereof, and means for adjusting the relative position of said objects, defects of binocular vision being indicated by discrepancies between apparent and actual relative position of the objects.

4. A device of the character described for testing space perception of a person comprising supporting means, a test object mounted on said supporting means and having a three dimensional irregular pattern preponderantly inducing non-perspective stereoscopic space perception, a second test object on said support adjacent to said first object and shaped preponderantly to induce perspective space perception, means associated with said supporting means for positioning the person to be tested relatively to said objects for simultaneous observation thereof, means between said objects and said positioning means for shielding the margins of said first object from both eyes, means for adjusting the relative position of said objects, and optical means mounted in front of the patient's eyes for varying the relation of the ocular images of the respective eyes, thereby varying the apparent relative position of said test objects, defects of binocular vision being indicated by the optical means effecting a predetermined relation between apparent and actual relative position of said objects in conjunction with said relative position.

5. A device of the character described for testing space perception of a person comprising supporting means, a test object adjustably mounted on said supporting means having a three dimensional irregular pattern preponderantly inducing non-perspective stereoscopic space perception, a second test object on said supporting means adjacent to said first object and shaped preponderantly to induce perspective space perception affected by ocular image incongruities, having a pattern including laterally displaced shapes, means associated with said supporting means for positioning the person to be tested relatively to said objects for simultaneous observation thereof, means in front of said first object shielding from the eyes of the person the margins of said first object, and means for adjusting the relative position of said objects, defects of binocular vision being indicated by discrepancies between apparent and actual relative position of the objects.

6. A device of the character described for testing space perception of a person comprising supporting means, a test object adjustably mounted on said supporting means having a three dimensional irregular pattern preponderantly inducing non-perspective stereoscopic space perception, a second test object on said supporting means adjacent to said first object and shaped preponderantly to induce perspective space perception unaffected by ocular image incongruities, having a pattern lacking laterally displaced shapes, means associated with said supporting means for positioning the person to be tested relatively to said objects for simultaneous observation thereof, means in front of said objects shielding from the eyes of the person the margins of said first object and any portions of said second object which present laterally displaced lines, and means for adjusting the relative position of said objects, defects of binocular vision being indicated by discrepancies between apparent and actual relative position of the objects.

7. A device of the character described for testing space perception of a person comprising supporting means, a test object adjustably mounted on said supporting means having a three dimensional irregular pattern preponderantly inducing non-perspective stereoscopic space perception, a second test object on said supporting means adjacent to said first object and shaped preponderantly to induce perspective space perception, means associated with said supporting means for positioning the person to be tested relatively to said objects for simultaneous observation thereof, shielding means between said objects and said positioning means for obscuring the margins of said first object and presenting said first object to both eyes and said second object to one eye of the person, and means for adjusting the relative position of said objects, defects of binocular vision being indicated by discrepancies between apparent and actual position of the objects.

8. A device of the character described for testing space perception of a person, comprising a support, a test object mounted on said support and having a three dimensional irregular pattern preponderantly inducing non-perspective stereoscopic space perception, means associated with said support for positioning the person relatively to said object, and a test frame placed on said supporting means between said object and said positioning means shaped to obscure to the person the margins of said object and having outlines inducing perspective space perception, defects of binocular vision being indicated by discrepancies between apparent and actual relative position of said object and said frame.

9. A device of the character described for testing space perception of a person, comprising a support, a test object adjustably mounted on said support and having a three dimensional pattern preponderantly inducing non-perspective stereoscopic space perception, means associated with said support for positioning the person relatively to said object, a test frame placed on said supporting means between said object and said positioning means shaped to obscure to the person the margins of said object and having outlines inducing perspective space perception, and means for adjusting the relative position of said object and said frame, defects of binocular vision being indicated by discrepancies between apparent and actual relative positions of said object and said frame.

10. A device of the character described for testing space perception of a person, comprising supporting means, a test object mounted on said supporting means and having a three dimensional irregular pattern preponderantly inducing non-perspective stereoscopic space perception, means associated with said supporting means for positioning the person relatively to said object, a test frame placed on said supporting means between said object and said positioning means shaped to obscure to the person the margins of said object and having outlines inducing perspective space perception, and masking means placed between said frame and said positioning means for obscuring said frame to one of the eyes of the person, defects of binocular vision being indicated by discrepancies between apparent and actual relative position of said object and said frame.

11. A device of the character described for testing space perception of a person comprising supporting means, a test object adjustably mounted on said supporting means and having a three dimensional irregular pattern preponderantly inducing non-perspective stereoscopic space perception, a second test object mounted on said support adjacent to said first object and shaped preponderantly to induce perspective space perception, means associated with said supporting means for positioning the person to be tested relatively to said objects for simultaneous observation thereof, shielding means between said objects and said positioning means for presenting said first object to both eyes and said second object to one eye of the person, means for adjusting the relative position of said objects, and optical means mounted in front of the patient's eyes for varying the relation of the ocular images of said first object, thereby varying the apparent relative position of said test objects, defects of binocular vision being indicated by the optical means effecting a predetermined relation between apparent and actual relative position of said objects and by said relative positions.

12. The art of testing space perception which comprises presenting to both eyes of a person an object having a three dimensional irregular pattern producing upon binocular observation images inducing preponderantly non-perspective stereoscopic space perception, determining the actual position of said test object as compared with the position thereof apparent to the person thereby relating vestibular and non-perspective stereoscopic space perception, presenting, as a separate testing step, to both eyes of said person an object having a three dimensional irregular pattern producing upon binocular observation images inducing preponderantly non-perspective stereoscopic space perception and simultaneously presenting to one of said eyes a test object having definite outlines producing an image which induces preponderantly monocularly perspective space perception, determining the apparent relative positions of said test objects thereby relating non-perspective stereoscopic space perception and monocularly perspective space perception, and determining the quality of vestibular space perception by relating non-perspective stereoscopic space perception to both monocularly perspective and vestibular space perception.

13. The art of testing space perception which comprises presenting to both eyes of a person an object field having a three dimensional irregular pattern producing upon observation with both eyes images preponderantly inducing non-perspective stereoscopic space perception, substantially eliminating from the margins of the object field any cues to perspective space perception, adjusting the location of said object field by tilting it to appear to said person in a predetermined position, and determining the actual and apparent locations of said object as compared with each other, respectively, discrepancies of said apparent and actual locations indicating defects of binocular vision.

14. The art of testing space perception which comprises presenting to both eyes of a person an object field having a three dimensional irregular pattern producing upon observation with both eyes images inducing preponderantly non-perspective stereoscopic space perception, simultaneously producing in at least one of said eyes the image of an object field proponderantly inducing perspective space perception, relatively tilting said object fields causing them to appear to the person in a predetermined relative position, and determining the actual and apparent relative locations of said object fields as compared with each other, respectively, discrepancies of said apparent and actual locations indicating defects of binocular vision.

15. The art of testing space perception which comprises presenting to both eyes of a person an object having a three dimensional irregular pattern producing upon observation with both images inducing preponderantly non-perspective stereoscopic space perception, simultaneously producing in one of said eyes the image of an object preponderantly inducing perspective space perception, determining the relative locations of said objects as compared with each other, respectively, as appearing to the person, and adjusting the dimensional relation of the ocular images of said objects until said objects appear to the person substantially in their actual relative position, said optical image adjustment indicating defects of binocular vision.

16. The art of testing space perception which comprises presenting to both eyes of a person an object having a three dimensional irregular pattern producing upon binocular observation images preponderantly inducing non-perspective stereoscopic space perception, simultaneously producing in at least one of said eyes the image of an object preponderantly inducing perspective space perception, optically adjusting said objects to appear to the person in a predetermined relation, and determining the adjusted apparent relative position as compared with the actual position of said objects, the optical adjustment indicating defects of binocular vision.

17. The art of testing space perception which comprises presenting to both eyes of a person an object having a three dimensional irregular pattern producing upon binocular observation images inducing non-perspective stereoscopic space perception, simultaneously producing in at least one of said eyes the images of an object preponderantly inducing perspective stereoscopic space perception, optically adjusting the apparent position of said first object by adjusting the dimensional relation of the ocular images thereof, and determining the apparent relative position as compared with the actual position of said objects, the ocular image adjustment indicating ocular image incongruities.

18. A device of the character described for testing binocular space perception of a person, comprising a base, mounted on said base test target means having a multiplicity of irregularly arranged three dimensional pattern elements constituting a test object portion mainly extending in a plane intersecting the line of sight and said target having another portion shaped to exclude from said first portion substantially all cues to perspective space perception, means associated with said base for positioning the person relatively to said target means for binocular observation thereof, means for adjusting at least said first mentioned portion relatively to said base about at least one axis parallel to said plane, into a test position as apparent to the person, and means indicating the actual position of said rotatable portion relatively to said base discrepancies between apparent and actual positions of said rotatable portion indicating defects of binocular space perception.

19. A device of the character described for testing binocular space perception of a person, comprising a base, mounted on said base test target means having a portion extending in a plane intersecting the line of sight, and carrying a multiplicity of three dimensional pattern elements, each element being shaped substantially to exclude cues to perspective space perception, and the elements being irregularly arranged upon said plane, said elements consisting a test object shaped preponderantly to induce non-perspective space perception, means associated with said base for positioning the person relatively to said target means for binocular observation thereof, means for adjusting said target means relatively to said base about at least one axis parallel to said plane, into a test position as apparent to the person, and means indicating the actual position of said plane relatively to said base, discrepancies between apparent and actual positions of said plane indicating defects of binocular space perception.

20. A device of the character described for testing binocular space perception of a person, comprising a base, mounted on said base test target means, means for adjustably holding said test target means, said test target means comprising a test object portion mainly extending in a plane intersecting the line of sight and a second portion shaped preponderantly to induce non-perspective space perception, at least said first one of said portions having a substantially flat body with substantially transparent and substantially opaque parts, respectively, forming part of an optical test pattern, superimposed in spaced relation to said body along said line, means substantially duplicating said pattern, said body and said duplicating means constituting together a three dimensional test target, means associated with said base for positioning the person relatively to said target, means for binocular observation thereof, means for rotatably adjusting at least one of said portions relatively to said positioning means about at least one axis in said plane, into a test position as apparent to the person, and means indicating the actual position of said rotatable portion relatively to said base, discrepancies between apparent and actual positions of said portion indicating defects of binocular space perception.

21. In an eye testing device of the character described, a test object and holding means for said test object, said test object comprising two substantially flat bodies superimposed in spaced relation to each other along an axis of observation, each body having portions forming part of an optical test pattern, one of said portions of one of said bodies being substantially transparent for a pattern portion of the other body, said patterns of said bodies constituting together a three dimensional optical test target, and means for adjusting the distance between said bodies providing binocular fusion at a given observation distance.

22. In an eye testing device of the character described, a test object and holding means for said test object, said test object comprising a substantially flat body having a pattern with transparent and opaque portions distributed thereover forming part of an optical test object and superimposed in spaced relation along an axis of observation a reflecting surface facing said body, and means for adjusting the distance between said body and said surface, said pattern and its virtual image reflected from said surface constituting together a three dimensional optical test target providing binocular fusion at a given observation distance.

23. In an eye testing device of the character described, a base, on said base means for positioning the head of a patient, a flexible test target arranged on said base for observation by the patient, means between said head positioning means and said target for eliminating from the margins of the target cues inducing perspective space perception, and means for adjustably twisting or distorting at least part of said target into three dimensionally curved shapes.

ADELBERT AMES, Jr.